INVENTOR
JAN W. RABEK
BY
ATTORNEY

INVENTOR
JAN W. RABEK
BY Samuel Cohen
Attorney

July 4, 1967 J. W. RABEK 3,329,424

CARD TRANSPORT SYSTEM

Filed Aug. 15, 1966

3 Sheets-Sheet 3

INVENTOR
JAN W. RABEK
BY Samuel Cohen
Attorney

United States Patent Office 3,329,424

Patented July 4, 1967

3,329,424

CARD TRANSPORT SYSTEM

Jan W. Rabek, Los Angeles, Calif., assignor to Radio Corporation of America, a corporation of Delaware Filed Aug. 15, 1966, Ser. No. 572,270
5 Claims. (Cl. 271—64)

ABSTRACT OF THE DISCLOSURE

An apparatus for directing a moving card such as an information storage card into one of a number of different paths. The apparatus is shown in the environment of a mass memory system where under some conditions it is desired that the card remain on a card driving element such as a drum for several drum revolutions to permit information to be written on or read from a plurality of "tracks" on the card and under other circumstances for the card to leave the drum and return via a second path to a card storage magazine.

"Mass memories" for the storage of large amounts of binary information are often employed in modern data processing systems. In one such memory, the storage medium is a plastic card coated with magnetic material. A large number of such cards are stored in magazines and any card in any magazine may be selected upon command.

The selection of a card involves withdrawing it from a magazine and placing it into a card travel path. There, the card is driven to a read/write station where information may be recorded on and/or read from the card and then the card is returned via another card travel path to a magazine. The card travel paths include numbers of alternate routes and a card is directed into desired ones of these routes by so-called "gates." A gate is a pivotable, cam-shaped element which is movable to different positions aligned with alternate routes along which a card may travel.

While the gate described above is useful and operative, it does have a number of disadvantages. The first is that because of the high speed at which the card travels and the force with which the card presses against the gate as it moves past the gate, the card surface which engages the gate wears. This shortens the life of the card and, in addition, increases the machine maintenance required because the material abraded from the card must be removed relatively frequently. Moreover, the leading edge of the card strikes the gate with great force and this increases the possibility of damage to the card and to the gate.

The object of the present invention is to provide an improved card guiding arrangement in which the effects discussed above are greatly reduced.

In the arrangement of the invention, an endless belt which is normally employed to hold the card in place during the movement of the card along its travel path is employed also to guide the card. One portion of the belt is located adjacent to a plurality of alternate routes and is movable to different positions for guiding the card to the different routes. The other portion of the belt remains in its original position and continues to perform its normal function—that of holding the card in place as it is being driven. The means for changing the belt position may be a roller along which the belt rides which in one position causes the portion of the belt passing over that roller to hold the card in place immediately adjacent to the path along which it is moving and in another position spaced from the path along which the card is moving permits the card to take an alternate route.

The invention is discussed in greater detail below and is shown in the following drawings of which:

Figures 1, 2, 3:
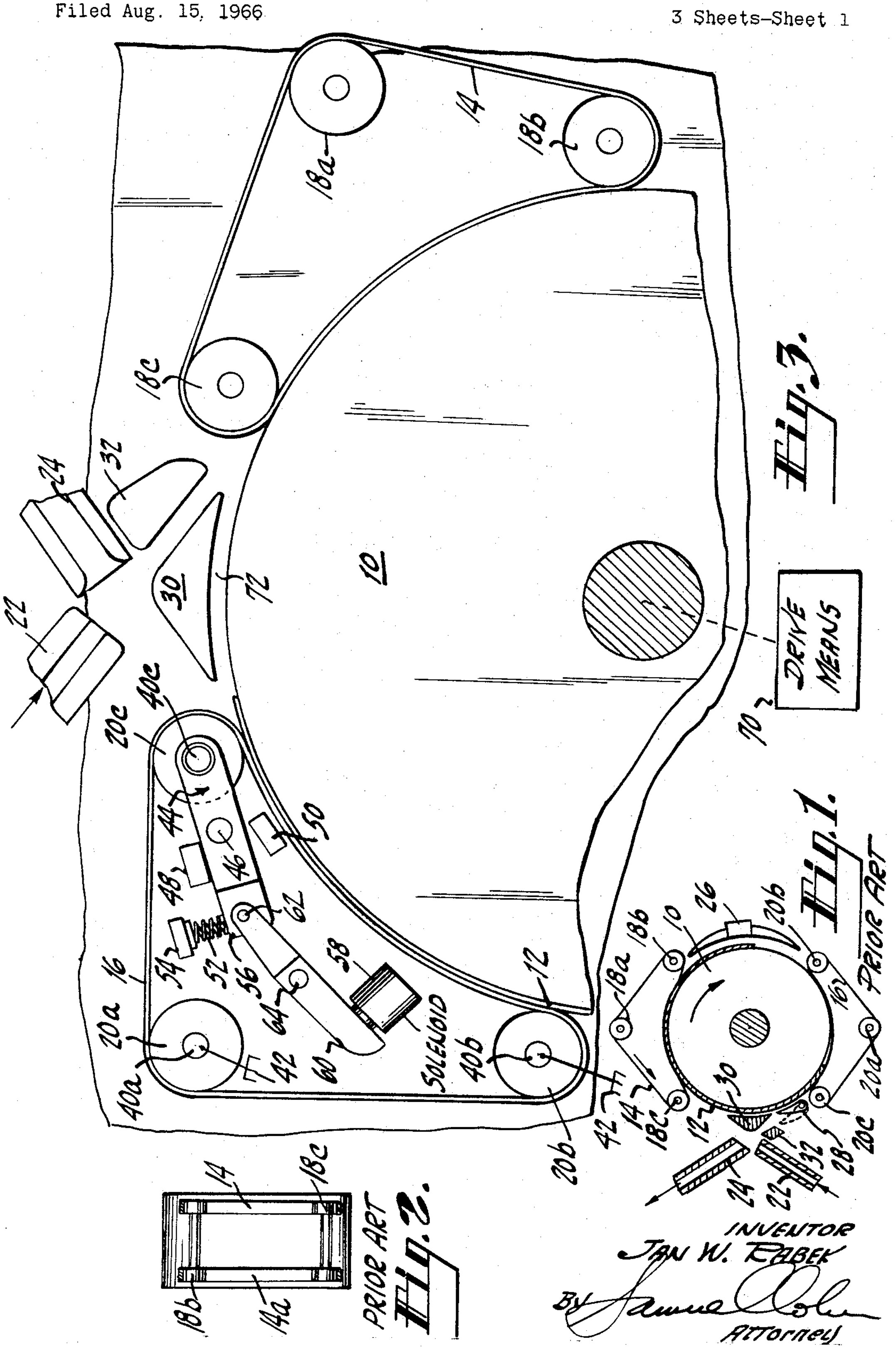
FIGURES 1 and 2 are schematic showings of a prior art card moving and guidance arrangement.
FIGURE 3 is a schematic showing of a card guidance arrangement according to one embodiment of the present invention.

The prior art card system shown in part in FIGURE 1 includes a rotating drum or capstan 10 and a card 12 on the surface of the drum. The card is 16" x 4½" and the long dimension of the card extends in the circumferential direction of the drum. The card is held in place on the drum by a plurality of sets of endless belts, two of which belts 14 and 16 are visible in FIGURE 1. These belts are mounted on idler rollers **18*a*, 18*b* and 18*c* for belt 14 and 20*a*, 20*b* and 20*c* for belt 16**.

A card reaches the drum through an entrance path, a portion of which is shown at 22, and leaves the drum via an exit path, a portion of which is shown at 24. Information may be read from or recorded on the card at the read/write station shown schematically at 26. The card may be retained on the drum for one or more passes of the card through the read/write station 26 and then permitted to leave the drum. The position of the gate 28 determines whether the card will recirculate on the drum or pass to the exit path 24.

In the operation of the system of FIGURE 1, a card enters the drum 10 through the entrance passage 22, the 4½ inch card dimension comprising the leading edge of the card. The moving card engages the surface of the moving drum 10 and the belt 14, which moves with the drum and which engages the opposite surface of the card, holds the card in place as the drum rotates. The read/write station 26 which consists of a plurality of read/write heads, permits simultaneous access to a plurality of parallel tracks along the length of the card. As one example the heads at 26 may write on 16 such tracks at the same time. Thereafter, the position of the heads at 26 may be changed slightly by moving the heads in the direction corresponding, for example, to the direction into the paper, and the card recirculated past the heads for permitting the heads to write on 16 other parallel tracks on the card interlaced with the first group of 16 tracks. With the gate element 28 in the position shown, the card will remain on the drum and continuously circulate past the read/write station 26.

When it is desired to remove the card from the drum, the gate 28 is moved to the dotted line position. Now, due to centrifugal force, the leading edge of the card moves away from the drum as the leading edge passes the gate 28 and the card travels between elements 30 and 32 to the exit path 24.

While only single belts 14 and 16 are visible in FIGURE 1, in practice there may be a plurality of such belts. For purposes of illustration, two such belts 14 and **14*a*** are shown in the top view of FIGURE 2. These two belts hold the opposite longer edges of the card against the drum surface as the drum rotates. The belts, of course, move at the same speed as the card.

Figures 4, 5:
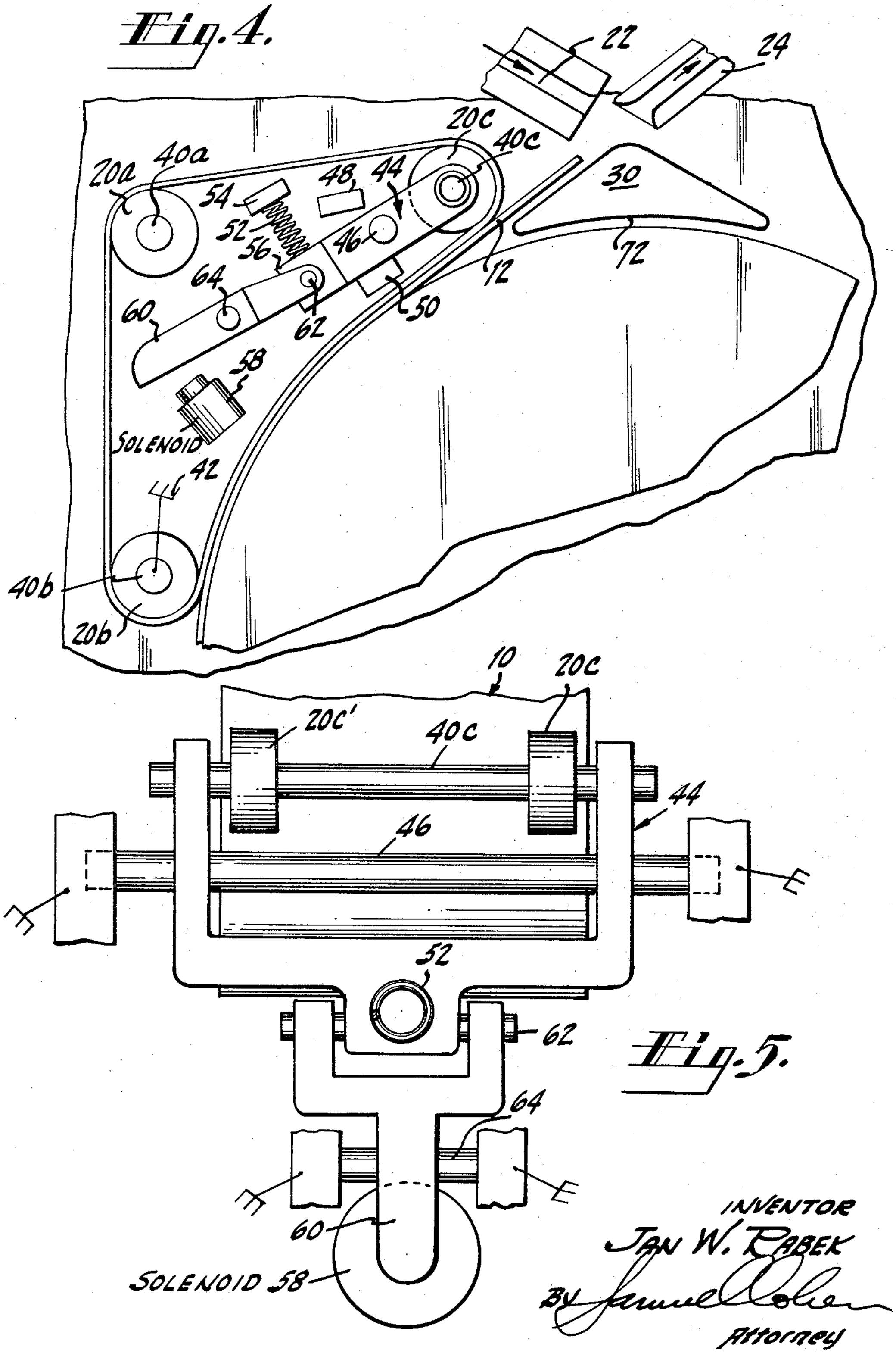
FIGURE 4 is a drawing of a portion of the arrangement of FIGURE 3 showing the belt in its second position.
FIGURE 5 is a side view of a portion of the system of FIGURE 3.

One embodiment of an improved arrangement according to the present invention is shown in FIGURES 3–5. Similar parts in these figures and in FIGURES 1–2 are identified by the same numerals. The belt 16 is mounted on three rollers 20_a_, 20_b_ and 20_c_. Rollers 20_a_ and 20_b_ are rotatable about axles 40_a_ and 40_b_, respectively and these axles are fixed to the chassis as indicated by the symbol 42. The roller 20_c_, however, is rotatable about an axle 40_c_ which is not fixed to the chassis but instead is supported by a yoke 44. The latter is rotatable about fixed axle 46 between a first position against stop 48 as shown in FIGURE 3 and a second position against stop 50 as shown in FIGURE 4. A spring 52 is located between a fixed support 54 and the end portion 56 of the yoke 44.

The means for driving the yoke is shown to include a solenoid 58 which is mechanically coupled to the yoke by a lever arm 60. The latter is secured to the yoke 44 by axle 62 and is rotatable about axle 64. The fit between the axle 62 and the yoke 44 is loose (a slot may be employed) to permit the axle to slide relatively to the yoke.

In operation, the drum 10 is rotated at high speed by drive means 70 which may be a motor or the like. A card moving at high speed enters the drum through entrance path 22. When it reaches the drum it is engaged between the drum surface and the belt 14. The drum moves the card toward the read/write station (not shown but in a position similar to that of the read/write station of FIGURE 1) and after the card leaves the read/write station, it is engaged between the belt 16 and the surface of the drum 10. When the solenoid is actuated as shown in FIGURE 3, the roller 20_c_ maintains the leading edge of the card adjacent to the drum surface and the card passes through passageway 72 and is thereafter again driven past the read/write station.

When it is desired that the card leave the drum, the solenoid 58 is de-energized. The spring 52, which is a relatively heavy spring and in a state of compression when the solenoid is energized, moves the yoke to the position shown in FIGURE 4 when the solenoid is de-energized. In this position, the roller is spaced a substantial distance above the drum surface. When the leading edge of the card reaches the position of this roller, centrifugal force causes the leading edge of lift off the drum surface and the card passes into the exit path 24. This path extends tangential to the drum surface.

A side view of the emodiment of FIGURES 3 and 4, with the belts removed, is shown in FIGURE 5. For purposes of illustration, two rollers 20_c_ and 20_c'_ are shown. However, there may be three or more such rollers and corresponding belts, depending upon the card width and other design criteria.

Figure 6:
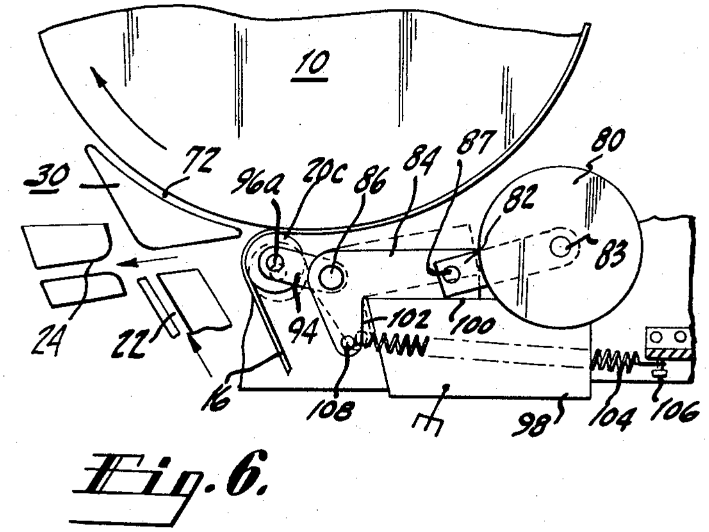
FIGURE 6 is a top view of a second embodiment of the present invention.
Figure 7:
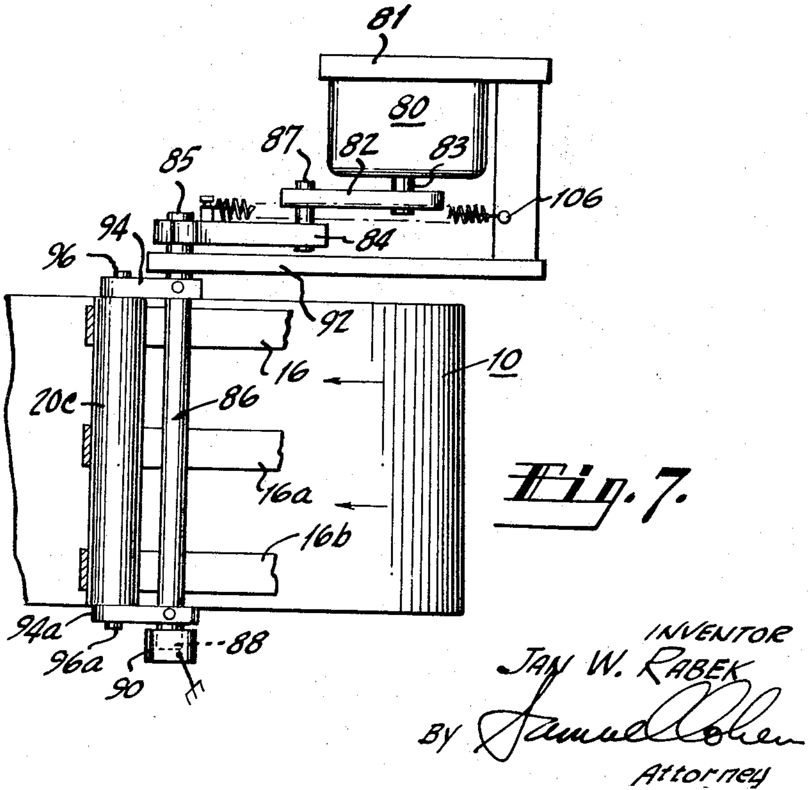
FIGURE 7 is a side view of a portion of the arrangement of FIGURE 6.

A second embodiment of the invention is illustrated in FIGURES 6 and 7. The drum and the entrance and exit paths are identified by the same reference numerals as in the previous figures. One of the belts is shown in part at 16 and the movable roller is shown at 20_c_. The idler rollers corresponding to rollers 20_a_ and 20_b_ of FIGURES 4 and 5, although present and in the same positions as the idler rollers of the previous figures, are not shown in FIGURE 6 or 7.

The drive mechanism is a rotary solenoid 80, which is mounted on supporting plate 81. The drive element 83 of the solenoid is fixed to link 82 and the latter is pivotally connected at 87 to a generally L-shaped arm 84. The arm is fixed to one end 85 of an axle 86. The axle 86 passes through an opening in the supporting plate 92 and is rotatable in this opening. The opposite end 88 of the axle is rotatably mounted in the supporting structure 90.

The yoke elements 94, 94_a_ are fixed at one end to the axle 86. The shaft 96, 96_a_ of the roller 20_c_ is rotatably supported at the opposite end of the yoke elements 94 and 94_a_.

A single stop plate 98 is all that is needed in this particular design. In the position of the L-shaped arm 84 shown in solid line in FIGURE 6, the edge 100 of the arm abuts the stop and in the position of the arm 84 shown by dashed lines in FIGURE 6, the edge 102 of the arm abuts the stop.

A spring 104 is secured at one end to a pin 106 on the supporting structure and at its other end to a pin 108 on the arm 84. The spring tends to pull the arm to the dotted line position shown in FIGURE 6.

In the operation of the embodiment of FIGURES 6 and 7, when the rotary solenoid is actuated, the roller 20_c_ maintains the belts, three of which 16, 16_a_ and 16_b_, are shown by way of illustration in FIGURE 7, against the drum. The link 82 is moved by the solenoid downwardly until the edge 100 of L-shaped arm 84 strikes the stop plate 98. During this movement of the arm 84, the axle 86, which is fixed to the arm, rotates clockwise (as viewed in FIGURE 6). The yoke elements 94, 94_a_ which are secured to the axle 86 are therefore also moved in the clockwise direction toward the drum 10 and the portion of the belt carried by the roller 20_c_ engages the drum. The drum is driven in the clockwise direction and in the position shown in FIGURE 6 of the roller and belt, any card present on the drum is directed into the passage 72 and recirculates on the drum.

When it is desired that the card leave the drum, the solenoid 80 is inactivated. The spring 104 thereupon moves the arm 84 in a counterclockwise direction (as viewed in FIGURE 6) until the edge 102 of arm 84 strikes the stop plate 98. When this occurs, the arm 84 is in the position shown by dotted lines in FIGURE 6. The counterclockwise movement of the arm 84 causes a corresponding counterclockwise rotation of the axle 86. The yoke elements 94 and 94_a_, which are fixed to the axle 86, therefore move the roller 20_c_ to the dashed line position—a position spaced a substantial distance from the drum surface. In this position, a card present on the drum, passes into the exit passageway 24 in the manner already described in connection with FIGURES 3 and 4.

While the invention has been illustrated in connection with a drum, it is to be appreciated that the same arrangement may be used along any card guiding path. In any such use, the roller, corresponding to 20_c_, in one position causes the card to take one path and in another position permits the card to take a second path.

Some important features of the present invention are first that the belt performs at least a dual function, both that of holding the card in place in its path and changing the direction of travel taken by the card. While in the embodiment of the invention illustrated, the card driving means is the drum, the belt itself may instead perform this third function as well. In this case, one of the rollers such as 20_a_ is coupled to a motor or the like which drives the belt and the card. Another feature of the present invention is that as both the belt and the card move at the same speed, there is very little wear between the card and belt. This contrasts with the prior art arrangement in which the card moves past a stationary gate element which changes the direction of card travel. Because there is little wear of the card by the card guidance arrangement of the present invention, the need for frequent cleaning of the card guidance means is essentially eliminated. Finally, in the present arrangement, as contrasted from the prior art, there is no impact between the leading edge of the card and a non-moving card guidance element and therefore little possibility of damage to the card.

What is claimed is:

1. In a card transport system, in combination:

a curved first path along which the card is adapted to be driven;

card driving means defining one side of the curved first path which imparts to a card being driven two components of motion, one in the direction of the leading edge of the card and the other, due to centrifugal force, in a direction outwardly from said card driving means;

belt means defining the other side of said curved first path which, in a first position, maintains the card, including both the leading and lagging edges thereof, against said card driving means as the card moves;

means coupled to the downstream portion of said belt means for moving said portion to a second position relative to said card driving means which is spaced further from the card driving means than the same portion of the belt means in its first position, whereby the centrifugal force acting on the card, as the card moves, causes the leading edge thereof to move outwardly from said card driving means when the leading edge reaches the downstream portion of said belt means;

a second path opening on said first path for receiving the card when said belt means is in said one position; and a third path also opening on said first path and spaced further from said card driving means than said second path for receiving a card when said belt means is in its second position.

2. An arrangement as set forth in claim 1, wherein said card driving means comprises a drum which is rotatable about a fixed axis.

3. An arrangement as set forth in claim 1, wherein said belt means rides on at least two rollers, one of said rollers being located adjacent to said first path in position such that the belt means engages a card when the card is in said first path and aligned with the roller, and said second roller being movable relatively to said card driving means between a first position adjacent said first path for guiding the card into said second path and a second position for guiding the card into said third path.

4. In a card transport system, in combination:

a rotatable drum;

a belt, a portion of which is engaged with a portion of the drum surface and movable with the drum for holding a card on the drum surface as the drum rotates;

first and alternate paths for receiving the cards when the leading edge thereof passes the downstream end of the portion of said belt engaged with the drum surface; and means for guiding said card into one of said two paths comprising means coupled to the downstream end of said belt for moving the same between two positions, the first immediately adjacent to the drum surface and leading to the first path and the second spaced from the drum surface for guiding the card into the second path.

5. In a card transport system as set forth in claim 4, said belt comprising an endless belt mounted on two idler rollers and a positionable third roller, one of said idler rollers positioned adjacent to the drum surface, and the means for guiding the card comprising means for positioning said third roller to one of two different positions, the first adjacent to the drum surface so that the portion of the belt between it and said one idler roller engages the drum surface, and the second spaced a substantial distance from the drum surface so that a substantial portion of the belt adjacent to said third roller is spaced from the drum surface.

References Cited

UNITED STATES PATENTS

| | | | |
|---|---|---|---|
| 2,795,312 | 6/1957 | Howdle | 198—31 |
| 3,083,012 | 3/1963 | Poland | 271—64 |

EVON C. BLUNK, *Primary Examiner.*

M. L. AJEMAN, *Assistant Examiner.*